United States Patent
Bella et al.

(10) Patent No.: US 6,179,480 B1
(45) Date of Patent: Jan. 30, 2001

(54) FIBER OPTIC LIGHTING SYSTEM CONNECTOR

(75) Inventors: Joseph J. Bella, Wheaton; Thomas A. Benoit, Bourbonnais; Kenneth LeVey, West Chicago; William J. Olson, Barrington; David A. Shereyk, Homewood; Jeffrey M. Stupar, West Dundee; Richard A. Koscik, Richton Park, all of IL (US)

(73) Assignee: Illinois Tool Works Inc., Glenview, IL (US)

( * ) Notice: Under 35 U.S.C. 154(b), the term of this patent shall be extended for 0 days.

(21) Appl. No.: 09/334,388

(22) Filed: Jun. 16, 1999

(51) Int. Cl.[7] ........................................ G02B 6/36
(52) U.S. Cl. .................. 385/76; 385/55; 385/77
(58) Field of Search ................ 385/76, 53, 54, 385/58, 59, 56, 55, 64, 68, 69, 77, 78, 70, 81, 82, 84, 86; 439/139; 250/227.15

(56) References Cited

U.S. PATENT DOCUMENTS

| | | | |
|---|---|---|---|
| 3,996,189 | 12/1976 | Travnicek | 260/825 |
| 4,682,849 | 7/1987 | Kowata et al. | 385/115 |
| 4,704,660 | 11/1987 | Robbins | 362/560 |
| 4,780,510 | 10/1988 | Uemiya | 525/326.5 |
| 4,782,430 | 11/1988 | Robbins | 362/560 |
| 4,957,347 | 9/1990 | Zarian | 385/123 |
| 5,052,778 | 10/1991 | Jamshid | 385/125 |
| 5,058,985 | 10/1991 | Davenport | 385/123 |
| 5,067,831 | 11/1991 | Robbins et al. | 385/81 |
| 5,080,460 | 1/1992 | Erdman et al. | 385/81 |
| 5,095,517 | 3/1992 | Monguzzi et al. | 385/90 |
| 5,122,580 | 6/1992 | Zarian et al. | 526/64 |
| 5,149,467 | 9/1992 | Zarian | 264/1.5 |
| 5,221,387 | 6/1993 | Robbins et al. | 156/85 |
| 5,225,166 | 7/1993 | Zarian et al. | 422/109 |
| 5,298,327 | 3/1994 | Zarian et al. | 428/373 |
| 5,315,684 | 5/1994 | Szegda | 385/139 |
| 5,337,390 | 8/1994 | Henson et al. | 385/81 |
| 5,381,500 | 1/1995 | Edwards et al. | 385/78 |
| 5,418,874 | 5/1995 | Carlisle et al. | 385/76 |
| 5,425,120 | 6/1995 | Peterson et al. | 362/80 |
| 5,452,186 | 9/1995 | Dassanayake | 362/80 |
| 5,530,940 | 6/1996 | Ludwig, Jr. et al. | 385/31 |
| 5,647,658 | 7/1997 | Ziadi | 362/560 |
| 5,668,904 | * 9/1997 | Sutherland et al. | 385/72 |

OTHER PUBLICATIONS

Olflex Wire & Cable, Inc. "Skintop II" connector brochure, 3 pgs., No Month, No Year.

L. K. Rangan et al., "Light Pipe Optical Joints From Silicone Disks", 1988, pp. 496–499.

Madhu Baile, "Optically Transparent Silicone Elastomers", 1985, pp. 97–105, No Month.

Shincor Silicones, Inc. "KE–1935" product data sheet, 1 pg. No Month, No Year.

General Electric, "GE Silicones, RTV615 . . . High Strength Transparent Silicone Rubber Compound" data sheet, 4 pgs. No Month, No Year.

* cited by examiner

Primary Examiner—Phan T. H. Palmer
(74) Attorney, Agent, or Firm—John P. O'Brien; Mark W. Croll; Donald J. Breh

(57) ABSTRACT

A fiber optic lighting system connector for coupling a fiber optic cable to another fiber optic cable, or a light source, or a light fixture. The connector includes a sleeve member having a plurality of resilient fingers and an axial bore for receiving a fiber optic cable end portion. A cap is non-threadably coupled to the sleeve member and movable axially about the resilient fingers between first and second positions to constrict the resilient fingers about a fiber optic cable end portion or conductor member for axial retention thereof in the axial bore. The resilient fingers preferably include first and second recesses in corresponding side portions thereof, and a tooth disposed between and offset from the first and second recesses.

20 Claims, 3 Drawing Sheets

FIBER OPTIC LIGHTING SYSTEM CONNECTOR

CROSS REFERENCE TO RELATED APPLICATIONS

The present application is related to co-pending U.S. application Ser. No. 09/186,688 filed on Nov. 5, 1998 entitled "Fiber Optic Lighting System Connector" and co-pending U.S. application Ser. No. 09/283,398 filed on Apr. 1, 1999 entitled "Fiber Optic Lighting System Connector Coupling Medium", both of which are assigned commonly herewith and incorporated herein by reference.

BACKGROUND OF THE INVENTION

The invention relates generally to fiber optic lighting systems, and more particularly to fiber optic lighting system connectors therefor.

Fiber optic lighting systems are known and include generally one or more fiber optic cables for transmitting visible light from a source to one or more environment illuminating fixtures. The light is typically emitted from a halogen, or metal halide, or a broad spectrum source, and is transmitted through one or more fiber optic cables having a light transmitting core covered by an outer coaxial cladding, whereby the refractive index of the core is greater than that of the cladding to internally reflect light transmitted therethrough. In some fiber optic cables, the core is a PMMA material and the cladding is a TEFLON material. The cladding is usually covered by a protective coaxial outer sheath, or jacket, and may include a yarn or other strengthening material therebetween. Fiber optic cables suitable for lighting system applications have a diameter in a range generally between approximately 2 mm and approximately 25 mm, although the diameter may be more or less depending on the particular application requirements. The light fixtures include generally lenses and other devices coupled to the fiber optic cable for emitting, and sometimes diffusing, light where desired. In some applications, the fiber optic cable itself is oriented or modified to emit light directly therefrom, for example from an end portion thereof, or from exposed portions of the core along its axial length.

Fiber optic lighting systems have many advantages over conventional lighting systems, and are an attractive alternative for many applications. A single light source in a fiber optic lighting system may supply light through multiple fiber optic cables coupled to corresponding light emitting fixtures. This configuration has great potential for substantially reducing maintenance associated with changing multiple light bulbs required in conventional lighting systems. In aircraft passenger cabins, for example, a single light source located in a readily accessible equipment bay may power multiple overhead or aisle or other cabin light fixtures, thereby eliminating laborious and costly disassembly of interior panels required to replace conventional light bulbs.

Fiber optic lighting systems are also capable of isolating heat and undesirable wavelengths, particularly those in the ultraviolet portion of the spectrum, from the light emitting fixture. Thus fiber optic lighting systems are useful in applications where it is desirable to eliminate heat generated by conventional lighting systems, and in applications where ultraviolet radiation is a concern. For example, heat and ultraviolet radiation generated by conventional lighting systems may adversely affect food products illuminated thereby resulting in melting or early spoilage thereof. Fiber optic lighting systems are also useful in applications where it is desirable to isolate electrical equipment from the illuminated environment to reduce electromagnetic interference and to eliminate electrical hazards, for example in the illumination of swimming pools and other water bodies. Fiber optic lighting systems are also desirable for many other applications.

The potential application of fiber optic lighting systems however remains largely unrealized in part for inefficiencies associated with the transmission of power between the light source and the light emitting fixtures. Some power loss occurs as light propagates along the axial length of the fiber optic cable, and it is estimated that existing commercially available fiber optic cables lose approximately 2 percent of the transmitted power per linear foot of cable. Advances in materials science however are expected to substantially reduce these losses in the near future. Another source of power loss in fiber optic lighting systems, and that with which the present invention is concerned primarily, is associated with the mechanical coupling of fiber optic cables generally, and more particularly the connecting of fiber optic cables to light sources, and to other fiber optic cables, and to light emitting fixtures.

Known fiber optic lighting system connectors include the application of an epoxy, or more generally an adhesive, and/or shrink wrap materials about abutting fiber optic cable end portions. The application of adhesive however is time consuming and usually requires an assembly device to temporarily hold the cable end portions in axially abutting alignment until the adhesive hardens. The application of adhesive may also require heat or a radiation source to facilitate curing. Adhesives do have the advantage of filling gaps between the abutting cable portions, which tend to have relatively rough surfaces that otherwise reduce the efficacy of power transmission thereacross. Adhesives however often have different refractive properties, or indices, than fiber optic cables and conductor members of the light source and fixture, resulting in additional power loss, which is undesirable.

Shrink wrapping abutting end portions of fiber optic cables is less costly and time consuming than some adhesive couplings, but shrink wrapped couplings are generally relatively lossy since abutting cable end portions have a tendency to separate axially, thereby forming air gaps therebetween, which are a significant source of power loss. Shrink wrap materials are used often in combination with adhesives. However, neither shrink wrap nor adhesives are reusable since the coupling formed thereby must usually be destroyed to disassemble the fiber optic cable end portions, which may be damaged also.

Other known prior art connectors used in fiber optic lighting systems include adaptations from other technologies, which perform only marginally well. The SKINTOP II liquid tight strain relief cord connector available from Olflex Wire & Cable, Inc. Fairfield, N.J., for example, has been employed to couple fiber optic cables to light sources. The SKINTOP II connector includes generally a collet disposed about the fiber optic cable, and a sealing nut disposed about the cable and engaged with a first threaded outer surface portion of the collet. A tapered surface of the sealing nut urges axial finger members of the collet radially inwardly into clamping engagement with the fiber optic cable. A second outer threaded surface portion of the collet is coupled to the light source, thereby holding the fiber optic cable in abutting relation relative to a mating light conducting portion.

The SKINTOP II connector is designed for electrical applications, and includes a sealing member between the finger members and the fiber optic cable disposed therethrough. The SKINTOP II connector however does not bias the end portion of the fiber optic cable axially toward and into engagement with the mating end portion of the light source. Absent such an axial bias, it is not possible to eliminate power reducing air gaps, or occlusions, formed between the end of the fiber optic cable and the mating end portion of the light source when the SKINTOP II is used in fiber optic lighting systems.

Other known prior art connectors adapted from other technologies for use in fiber optic lighting systems include a multiple-component pneumatic conduit connector available from the John Guest Company, Madison, Wis. This connector includes a body member having a bore therethrough for accommodating mating conduit end portions and portions of a corresponding collet disposed thereabout. The collets have several metal teeth formed in corresponding flexible fingers thereof which bite into the conduits. The metal teeth are required apparently to engage either metal or plastic fluid conduits coupled by the connector. For this purpose, a c-shape spring clip disposed between an outer flange of the collet and an end portion of the body member urges the collet axially outwardly from the bore of the body member, thereby engaging the teeth of the finger members with the conduit. As the collet is drawn axially out the body member by the spring clip, however, so too is the conduit engaged by the teeth thereof, resulting in formation of an air gap between the end portions of abutting conduits. Thus, the John Guest connector does not axially bias the conduit end portions into mating engagement. The John Guest connector also includes an o-ring disposed between each conduit and the body member to form a fluid tight seal between the abutting end portions thereof, so that any spacing between the conduit end portions is not a concern in fluid coupling applications, for which the John Guest connector was designed. In fiber optic cable coupling applications, however, the John Guest connector provides a less than desirable coupling for its inherent tendency to form air gaps between abutting fiber optic cable portions. The John Guest connector is also relatively costly to manufacture, due in part to the metal teeth which must be formed in the plastic collet by insert molding or other means, and in part due to the many components and required assembly thereof.

U.S. Pat. No. 5,668,904 issued Sep. 1, 1997 to Sutherland et al. and entitled "Fiber Optic Cable Connector Apparatus and Method" discloses a communications fiber optic cable connector frame designed to mate with a communications industry standard connector block. A fiber optic cable is disposed coaxially in a grooved or threaded bore of a retaining collet, and the retaining collet has a threaded outer surface disposed in a threaded bore of the connector frame. An unthreaded tapered portion of the bore in the connector frame applies a radially inwardly directed force on the retaining collet as the collet is engaged therewith, to resist tension forces that tend to separate the fiber optic cable therefrom. A compressed spring disposed about an end portion of the connector frame and acting between a radial flange thereof and a cap disposed axially thereabout biases the connector frame and the fiber optic cable retained therein toward the connector block. The connector frame however is relatively complex for its many components, particularly the cap and spring assembly required to axially bias the cable toward the connector block, and is costly to manufacture. Moreover, the connector frame of U.S. Pat. No. 5,668,904 was designed specifically for coupling with a communications industry standard connector block.

The present invention is drawn toward advancements in the art of fiber optic lighting systems, and more particularly to fiber optic lighting system connectors therefor, and combinations thereof.

An object of the invention is to provide novel connectors for fiber optic lighting systems and combinations thereof that overcome problems in the prior art.

Another object of the invention is to provide novel fiber optic lighting system connectors having any one or more advantages over the prior art, including improved power transmission efficiency, improved economy, relative ease of assembly and disassembly, fewer components, reduced complexity, elimination of adhesives or epoxies, elimination of special tools for assembly, among other advantages.

A further object of the invention is to provide novel fiber optic lighting system connectors having one or more caps non-threadably coupled to a sleeve member, and movable axially relative thereto to axially retain a fiber optic cable end portion in the sleeve member.

Another object of the invention is to provide novel fiber optic lighting system connectors that apply and maintain an axially bias on a fiber optic cable end portion toward another fiber optic cable end portion or toward a conductor member of a light source or a light fixture retained or biased axially in an opposing direction to provide an improved coupling therebetween.

Another object of the invention is to provide novel fiber optic lighting system connectors having a coupling medium disposable between a fiber optic cable end portion and a conductor member to provide improved light transmission therebetween, and a related object of the invention is to provide a unitary coupling medium that also provides a seal between the connector and the fiber optic cable end portion and conductor member.

Still another object of the invention is to provide novel fiber optic lighting system connectors useable for coupling a fiber optic cable to a conductor member comprising generally a sleeve member having a plurality of resilient fingers and an axial bore for receiving the fiber optic cable and conductor member, and one or more caps non-threadably coupled to corresponding end portions of the sleeve member. Each cap is movable axially relative to the sleeve member between first and second positions to constrict the plurality of resilient fingers about a fiber optic cable or conductor member disposed in the axial bore thereof.

It is yet another object of the invention to provide novel fiber optic lighting system connectors having an improved sleeve member with a plurality of resilient fingers one or more of which have a corresponding tooth formable in a molding operation without damage to the tooth upon separation of a mold core.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
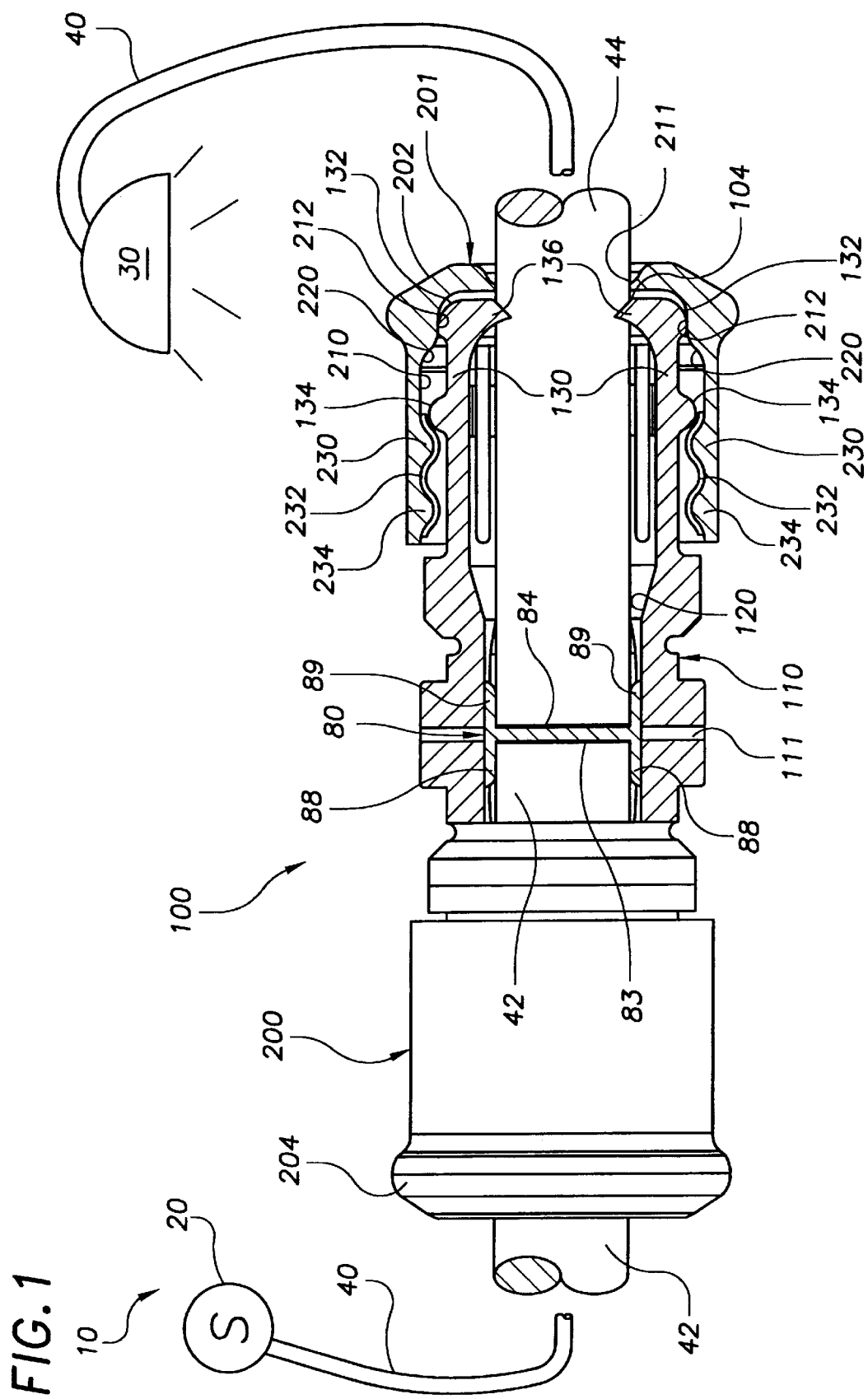
FIG. 1 is a partial sectional schematic view of a fiber optic lighting system having a fiber optic cable connector according to an exemplary embodiment of the invention.

FIG. 1 is a schematic view of a fiber optic lighting system comprising generally a light source 20 coupled to a light fixture 30 by a fiber optic cable 40. More generally, the light source 20 may supply light to multiple light fixtures through corresponding fiber optic cables, not shown but known generally.

The light source 20 may be any source suitable for use in fiber optic lighting systems, for example a halogen or metal halide or broad spectrum light source. The light fixture 30 may also be any light emitting and/or light diffusing fixture. Alternatively, the light source 30 may be a portion of the fiber optic cable itself oriented or modified to emit light directly therefrom, for example from an end portion thereof, or from exposed portions of the fiber optic core along its axial length.

FIG. 1 illustrates a fiber optic cable connector 100 retaining and coupling a first fiber optic cable end portion 42 and another light transmitting conductor member 44, both of which are disposed and retained axially in the connector 100, as discussed further below. The light transmitting conductor member 44 may be another fiber optic cable end portion, or a conductor member end portion of a light source or of a light fixture. The fiber optic cable connector 100 is thus useable generally to couple a fiber optic cable to another fiber optic cable, or to a light source or fixture.

In the present specification, including the claims thereof, references to a "light transmitting conductor member" or merely a "conductor member" encompass any one of a fiber optic cable end portion, a conductor member end portion of a light source or of a light fixture, and more generally any light transmission member, suitable for transmission of light in fiber optic lighting systems, that may be disposed in and coupled by the connector 100 of the present invention.

Figure 2:
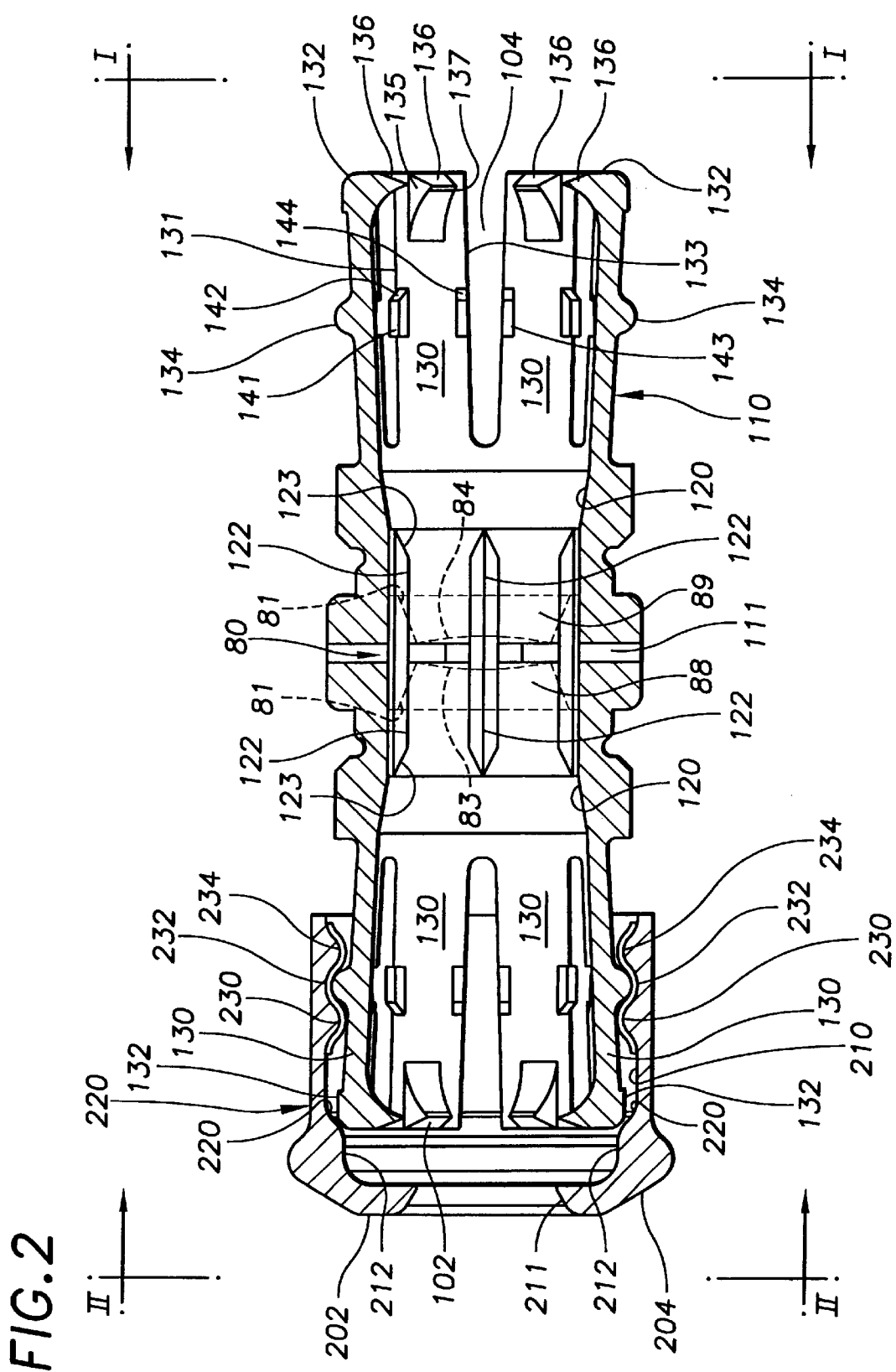
FIG. 2 is a partial sectional view of a fiber optic connector sleeve member and a cap on an end portion thereof.

FIGS. 1 and 2 illustrate the fiber optic cable connector 100 comprising generally a sleeve member 110 having an axial bore 120 for receiving a first fiber optic cable end portion 42 in a first end portion thereof and a conductor member 44 in a second end portion thereof. In the exemplary embodiment of FIG. 2, the sleeve member 110 is generally elongate, and the axial bore 120 is disposed fully therethrough preferably along a relatively linear path between opposing first and second end portions 102 and 104 thereof.

In other embodiments, the sleeve member 110 is not necessarily elongate, and may have any shape. Also, the axial bore 120 may be non-linear, or somewhat curved, whereby the fiber optic cable end portion 42 and the conductor member 44 enter the sleeve member 110 at an angle therebetween. These alternative configurations are possible since fiber optic cables are generally flexible, and may thus be inserted and fed along a curved path relatively easily. The conductor member of a light source or light fixture may also be flexible, and thus easily disposed along a curved axial bore of the sleeve member 110.

In some applications, a light source is located in or beyond a walled enclosure, and it is desirable to couple one or more fiber optic cables to a conductor member of a light source through the wall thereof, or more generally through a bulkhead. Thus the sleeve member 110 may be mounted alternatively in or through or formed integrally with a bulkhead for through bulkhead coupling between a fiber optic cable end portion and a conductor member, as discussed more fully in the related co-pending U.S. application Ser. No. 09/186,688 entitled "Fiber Optic Lighting System Connector" incorporated herein by reference.

Generally, in FIG. 1, both the fiber optic cable end portion 42 and the conductor member 44 are movable axially along the axial bore 120 of the sleeve member 110 toward each other and preferably into abutting contact with a coupling medium 80 disposed therebetween to form an efficient fiber optic coupling, as discussed further below. Alternatively, the fiber optic cable end portion 42 and the conductor member 44 may be positioned axially in direct abutting contact with each other. In other embodiments, the conductor member 44 may be fixed axially in the axial bore 120 of the sleeve member 110, and only the fiber optic cable end portion 42 is movable axially along the axial bore 120 of the sleeve member 110 toward the conductor member 44 to form a light transmitting coupling therebetween.

In some embodiments, the conductor member 44 extends from a light source or from a light fixture and has an end portion configured as a ferule, which is fixed axially in the axial bore 120 of the sleeve member 110. The conductor member of a fiber optic light source may, for example, be one of many other conductor members, not shown, extending therefrom in an octopus arm like configuration for coupling to corresponding fiber optic cables, wherein each conductor member has a ferule formed on an end portion thereof for coupling to a corresponding sleeve portion. A ferule and sleeve member configured for the accommodation thereof is disclosed more fully in the related co-pending U.S. application Ser. No. 09/186,688 entitled "Fiber Optic Lighting System Connector" incorporated herein by reference.

In some applications, it is desirable to prevent rotation of one or both the fiber optic cable end portion and the conductor member in the axial bore 120 of the sleeve member 110. To prevent rotation of the fiber optic cable end portion and the conductor member, the sleeve member 110 may include one or more wedge shaped rib members extending radially inwardly from the axial bore 120 thereof The wedge shaped rib members are configured to engage one or both the fiber optic cable end portion 42 and conductor member 44 in a manner that prevents rotation thereof yet permits axial movement thereof along the axial bore 120 of the sleeve member 110. The wedge shaped rib members also center the fiber optic cable end portion 42 and conductor member 44 in the axial bore 120 of the sleeve member 110.

Figure 3A:
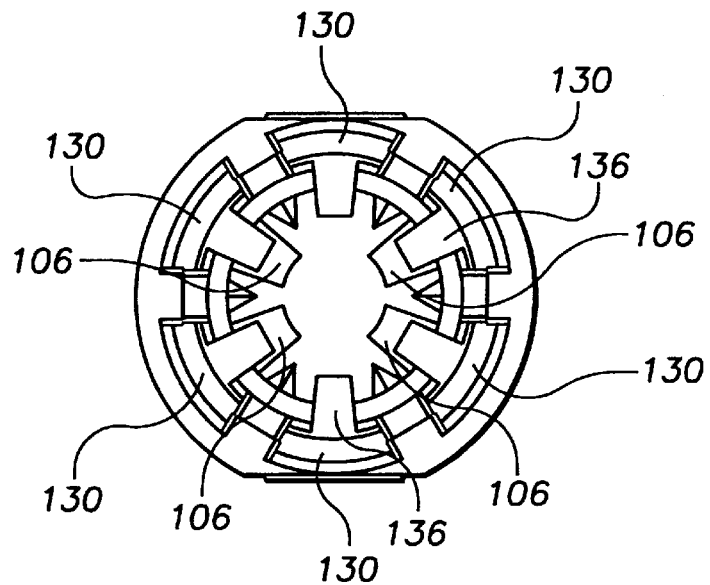
FIG. 3a is an end view along lines I—I of FIG. 2.
Figure 3B:
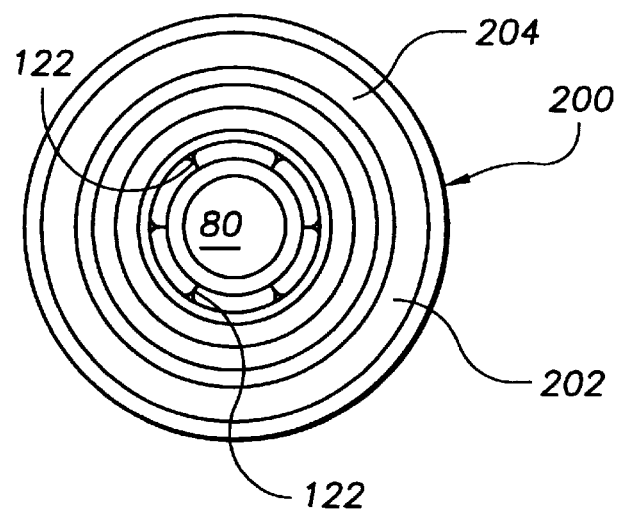
FIG. 3b is an end view along lines II—II of FIG. 2.

In FIGS. 2, 3a and 3b, a plurality of generally wedge shaped rib members 122 are located on a intermediate portion of the axial bore 120 and are aligned axially in the axial bore 120 of the sleeve member. The wedge shaped rib members 122 extend generally radially inwardly into the axial bore 120 to engage one or both of the fiber optic cable end portion 42 and conductor member 44, thereby preventing rotation thereof in the sleeve member 110. FIG. 2 illustrates opposing leading end portions of the wedge shaped members 122 also having wedge shaped surfaces 123 to facilitate insertion of the fiber optic cable end portion 42 and conductor member 44 into the axial bore 120 of the sleeve member 110. As the fiber optic cable end portion 42 and conductor member 44 are initially disposed axially into the sleeve member 110, the wedge shaped surfaces 123 cut into the outer sheath thereof.

The wedge shaped rib members 122 are shaped and sized to cut into the fiber optic cable end portion 42 and the conductor member 44 along the axial dimension thereof as the fiber optic cable end portion and conductor member are disposed into the axial bore 120. The wedge shaped rib members 122 are configured or sized however to cut only into the protective outer sheath or jacket of the fiber optic cable end portion and conductor member so far as is necessary to prevent rotation thereof in the axial bore preferably without cutting into the outer cladding of the fiber optic cable end portion and conductor member, thereby preventing or at least minimizing distortion of light transmitted therethrough.

Preventing rotation of the fiber optic cable end portion 42 and the conductor member 44 in the sleeve member 110 eliminates or at least substantially reduces the formation of air gaps, or occlusions, therebetween by ensuring proper rotational alignment thereof, particularly where one or both end surfaces of the end portion 42 and conductor member 44 are cut or otherwise formed in a manner that requires rotational alignment. Preventing rotation of the fiber optic cable end portion 42 and the conductor member 44 in the sleeve member 110 may also prevent scratching or other damage to mating end surfaces thereof or to the coupling medium 80 therebetween resulting from any particulate matter that may be become lodged therebetween. Preventing rotation of the fiber optic cable end portion 42 and the conductor member 44 in the sleeve member 110 may also prevent damage to the coupling medium disposed therebetween, for example resulting from rotational forces or torques applied thereto. Rotationally fixing the fiber optic cable end portion 42 and the conductor member 44 in the sleeve member 10 thus provides a more efficient light transmission coupling therebetween and is generally desirable.

FIGS. 1 and 2 illustrate the sleeve member 110 including a first plurality of at least two resilient fingers 130 on a first portion thereof and a second plurality of at least two resilient fingers 130 on a second generally opposing portion thereof, whereby the resilient fingers 130 define at least partially the axial bore 120 of the sleeve member 110. In the exemplary embodiment illustrated in FIG. 3a, the sleeve member 110 has six resilient fingers 130 on the end portion thereof, although this exemplary configuration is not intended to be limiting, and the sleeve member 110 may have more or less resilient fingers 130 than illustrated in the exemplary embodiment.

In other embodiments, the sleeve member 110 may have only a first plurality of resilient fingers 130 on either the first or second end portion 102 or 104 thereof, for example where the conductor member 44 is retained axially in the axial bore 120 of the sleeve member 110 by other means, as discussed generally above. In some embodiments, for example, the conductor member 44 is a ferule that is snap-fit or otherwise retained in the axial bore 120 without the constrictable resilient fingers 130 as discussed more fully in the related co-pending U.S. application Ser. No. 09/186,688 entitled "Fiber Optic Lighting System Connector" incorporated herein by reference.

The first and second plurality of resilient fingers 130 are generally constrictable radially inwardly to engage and retain a corresponding fiber optic cable end portion 42 and more generally a conductor member 44 in the axial bore 120 of the sleeve member 110 as discussed further below.

FIG. 1 illustrates a first cap 200 coupled to a corresponding first end portion of the sleeve member 110, which is identified in FIG. 2 as the first end portion 102, and a second cap 201 coupled to a second end portion 104 of the sleeve member. In FIG. 1, the second cap 201 includes an axial bore having a sleeve bore portion 210 for receiving a portion of the sleeve member 110 and a constricted bore portion 211 for receiving a portion of the fiber optic cable end portion 42 or conductor member 44 protruding from the axial bore 120 of the sleeve member 110. The first cap 200 is configured similarly to the second cap 201.

The first and second caps 200 and 201 are disposable generally about a corresponding one of the plurality of resilient fingers 130 and are non-threadably coupled to the sleeve member 110. The caps are movable axially relative to the sleeve member 110 to constrict and unconstrict the corresponding plurality of resilient fingers 130, and more particularly the caps are slidable axially relative to the sleeve member between a first position where the plurality of resilient fingers are constricted and a second position where the plurality of resilient fingers are not constricted.

FIG. 1 illustrates the second cap 201 in the first position whereby the resilient fingers 130 are constricted thereby to engage and axially retain the conductor member 44 in the axial bore 120 of the sleeve member 110. FIG. 2 illustrates the first cap 200 in the second position whereby the resilient fingers 130 are unconstricted to allow insertion and withdrawal of the fiber optic cable end portion or the conductor member into and out of the axial bore 120 of the sleeve member 110.

FIGS. 1 and 2 illustrate the caps each including a ramped, or camming, surface 220 on the axial bore thereof that reduces or constricts a diameter of the sleeve bore portion 210 of the cap toward a reduced diameter portion thereof discussed below. The ramped surface 220, which has preferably a generally annular shape, is enagageable with a finger engagement portion 132 of the plurality of resilient fingers 130 when the cap is disposed thereabout and moved axially relative thereto toward the first position. As the finger engagement portion 132 moves along the ramped surface 220, the constricting diameter of the axial bore constricts the resilient fingers 130 radially inwardly and into engagement with the conductor member 44 or fiber optic cable portion 42 disposed in the axial bore 120 of the sleeve member 110 as illustrated in FIG. 1. The reduced diameter portion 212 of the cap engages and maintains the resilient fingers in the constricted configuration when the cap is in the first position illustrated in FIG. 1.

At least one and preferably all of the plurality of resilient fingers 130 have a corresponding finger protuberance 134 extending generally outwardly therefrom as illustrated in FIGS. 1 and 2. The finger protuberances 134 are preferably located along an intermediate portion of the corresponding resilient finger 130 so that the resilient finger 130 may be flexed inwardly, as discussed further below.

The caps each include a first cap protuberance 230 extending into the axial bore thereof. The first cap protuberance 230 is engageable with the one or more finger protuberances 134 as the cap is moved axially relative to the sleeve member 110. In the exemplary embodiment, the first cap protuberance 230 is a generally annular member extending into the axial bore of the cap, and portions thereof are engageable with the plurality of finger protuberances 134 as the cap is moved axially between the first and second positions. FIG. 1 illustrates the finger protuberances 134 of the plurality of resilient fingers 130 engageable with the first cap protuberance 230 to maintain the second cap 201 in the first position so that the resilient fingers 130 remain constricted.

The caps each include also a cap recess 232 disposed in the axial bore thereof. In the exemplary embodiment, the cap recess 232 is disposed between the first cap protuberance 230 and a second cap protuberance 234 extending into the axial bore of the cap and spaced axially from the first cap protuberance 230. In the exemplary embodiment, the second cap protuberance 234 is a generally annular member extending into the axial bore of the first cap, and the recess is a generally annular recess disposed between the first and second generally annular cap protuberances. FIG. 2 illustrates the one or more finger protuberances 134 of the resilient fingers 130 disposable in the cap recess 232 of the first cap 200 when the cap is in the second position. The second cap protuberance 234 maintains the cap in the second position and prevents separation of the cap from the sleeve member.

The sleeve member 110 and the caps 200 and 201 are formed generally of a resilient material, for example a plastic formed in a molding operation. Thus as the cap is reciprocated or moved axially relative to the sleeve member between the first and second positions, the first cap protuberance 230 thereof engages the finger protuberances 134 and flexes the corresponding resilient fingers 130 inwardly to permit passage of the first cap protuberance 230 over the finger protuberances 134.

In an alternative embodiment, the second cap protuberance 234 extends farther radially into the axial bore of the cap than the first cap protuberance 230 so that less axial force is required to move the finger protuberances 134 past the first cap protuberance 230 than past the second cap protuberance 234. This alternative configuration reduces the possibility of the cap being separated inadvertently from the sleeve member when the cap is moved axially relative thereto from the first position illustrated in FIG. 1 to the second position illustrated in FIG. 2, since a greater axial force must be applied to the cap for the one or more finger protuberances to surmount the second relatively large cap protuberance than is required to pass along the first cap protuberance.

The cooperative action between the finger protuberances 134 and the first and second cap protuberances 230 and 234 also provides a tactile indication of where the cap is positioned relative to the sleeve member. The tactile characteristic will indicate with tactile certainty when the cap is moved filly to the first and second positions and thus indicate whether the resilient fingers are securely constricted or not.

To facilitate gripping and moving the cap axially relative to the sleeve member, the one or more caps are generally cylindrically shaped members having preferably a comfortably contoured and enlarged gripping knob portion 204, which may have a knurled or other gripping surface formed thereon to prevent slippage.

A fiber optic cable end portion 42 or conductor member 44 is disposed through the axial bore of the cap and into the axial bore of the sleeve member when the resilient fingers 130 of the sleeve member are not constricted. In other words, the cap is in the second position illustrated in FIG. 2. When the resilient fingers are not constricted, the fiber optic cable end portion or conductor member is readily insertable into the axial bore of the sleeve member relatively unimpeded thereby until the fiber optic cable end portion or conductor member abuts another fiber optic cable end portion or conductor member or ferule previously disposed and fixed axially in the opposing end portion of the sleeve member. In a preferred embodiment, illustrated in FIG. 1 and discussed further below, the fiber optic cable end portion or conductor member abuts a coupling medium 80 supported by an abutment member disposed in the axial bore of the sleeve member intermediate the other abutting fiber optic cable end portion and conductor member.

As noted, the cap is not threadably coupled to the sleeve member 110 and thus it is not necessary to rotate the cap relative thereto to constrict and unconstrict the resilient fingers 130 as in prior art connectors. The cap is merely moved axially relative to the sleeve member by grasping the cap and, in embodiments where the sleeve member is not fixedly mounted to a stationary object for example a bulkhead, by also grasping the sleeve member or the other cap. As discussed, the cap is retained on the sleeve member by the second cap protuberance 234, and is movable axially between the first and second positions to constrict and unconstrict the resilient fingers of the sleeve member. The cap is maintained in the first position by engagement of the first cap protuberance 230 with the finger protuberances 134 as illustrated in FIG. 1. And the cap is maintained in the second position when the finger protuberances 134 of the sleeve member are disposed in the cap recess 232 formed between the first and second cap protuberances as illustrated in FIG. 2.

To move the cap from the second position to the first position to unconstrict the resilient fingers, the cap and a portion of the fiber optic cable end portion 42 or conductor member 44 extending therefrom are grasped and moved axially into the axial bore 120 of the sleeve member 110. When the fiber optic cable end portion 42 or conductor member 44 are prevented from further axial movement upon abutment with another object in the axial bore 120 as discussed above, the cap continues to move axially relative thereto and relative to the sleeve member, and at the same time the fiber optic cable end portion 42 or conductor member 44 is biased into the axial bore of the sleeve member by the gripping action to maintain abutting contact with the other fiber optic cable end portion or conductor member or preferably the coupling medium 80 in the axial bore of the sleeve member. The cap is moved axially relative to the sleeve member until the resilient fingers 130 are constricted by the cap and the first cap protuberance 230 moves over the finger protuberances 134 to maintain the cap in the first position, whereby the resilient fingers are constricted about and axially retain, or maintain, the fiber optic cable end portion or conductor member biased against the coupling medium 80 or other fixed object in the axial bore of the sleeve member.

In one embodiment, at least one and preferably each of the plurality of resilient fingers 130 has one or more corresponding teeth protruding generally radially inwardly therefrom into the axial bore 120 of the sleeve member 110. In the exemplary embodiment, each of the plurality of fingers 130 includes a corresponding tooth 136 disposed near or proximate an end portion thereof. In alternative embodiments, however, multiple teeth, for example multiple protrusions or ridges extending generally radially into the axial bore 120 are disposed along one or more of the resilient fingers 130, preferably near the distal end portion thereof so that the teeth are engageable with a fiber optic cable end portion or conductor member when the resilient fingers are constricted to prevent withdrawal thereof from the axial bore of the sleeve member. In other embodiments, means other than teeth or mere frictional engagement by toothless resilient fingers engage and axially retain the fiber optic cable end portion or conductor member in the axial bore of the sleeve member.

The one or more teeth 136 are configured or sized to cut into the protective outer sheath or jacket of the fiber optic cable end portion and conductor member only so far as is necessary to prevent withdrawal thereof from the axial bore, and preferably without cutting into the outer cladding of the fiber optic cable end portion and conductor member to prevent or at least minimize distortion of light transmitted therethrough. Also, the finger protuberance 134 on the resilient fingers 130 is preferably offset relative to the corresponding tooth 136 to permit inwardly flexing of the resilient finger 130 as the first cap protuberance 230 passes along the finger protuberances 134, and to prevent the tooth 136 from cutting too deeply into the fiber optic cable end portion or conductor member as may occur if the finger protuberance 134 is located directly opposite the tooth 136. In the exemplary embodiment, the finger protuberance 134 is located along an intermediate portion of the resilient finger 130, and the tooth 136 is located near an end portion thereof.

As discussed the coupling medium 80 is preferably disposed in the axial bore 120 of the sleeve member 10 between the fiber optic cable end portion 42 and the conductor member 44, which are positioned axially and preferably biased into engagement therewith from opposing sides thereof to eliminate or at least substantially reduce occlusions therebetween. In embodiments not including a coupling medium, the fiber optic cable end portion 42 and the conductor member 44 are abutted directly against each other, and at least one of which is maintained in the abutting relationship by a corresponding cap as discussed above. The coupling medium 80 is preferred since it remarkably improves the efficiency of light transmission between the fiber optic cable end portion and the conductor member by eliminating or at least substantially reducing any air gaps therebetween.

The coupling medium 80 preferably has a refractive index that is the same as, or at least substantially the same as, a refractive index of the fiber optic cable end portion 42 and conductor member 44 retained and coupled in the connector 100, thereby further improving the light transmission efficiency therebetween. The coupling medium 80 is also preferably resilient to maintain firm contact with the fiber optic cable end portion 42 and the conductor member 44 between which it is disposed. The coupling medium 80 also has preferably a relatively low hardness, for example a Shore A hardness rating between approximately 20 and approximately 40, although these ratings are not intended to be limiting, and the hardness rating may be more or less depending on the particular application requirements. In one exemplary embodiment, the coupling medium 80 is an optical grade silicone material having a Shore A hardness rating of approximately 20.

FIG. 1 illustrates the coupling medium 80 comprising generally a disk shaped portion disposed between the fiber optic cable end portion 42 and the conductor member 44.

FIG. 2 illustrates in phantom the disk shaped portion preferably having convex surfaces on opposing end portions 83 and 84 thereof prior to installation between the fiber optic cable end portion and the conductor member. FIG. 1 illustrates the disk shaped coupling medium 80 after installation, wherein the ends 83 and 84 thereof are compressed relatively flat to fill any voids between the coupling medium and the fiber optic cable end portion 42 and the conductor member 44 thus forming a relatively continuous light transmitting medium therebetween substantially devoid of air gaps.

The coupling medium 80 is retained preferably in the sleeve member 110 by structure in the axial bore 120 thereof to prevent separation of the coupling medium 80 therefrom during handling and assembly and to facilitate alignment thereof during insertion of the fiber optic cable end portion and conductor member into the sleeve member.

In one embodiment, the coupling medium 80 is located and retained in the axial bore 120 of the sleeve member 110 by an abutment member or members. FIG. 3a illustrates a plurality of exemplary abutment members 106, which may be alternatively a single continuous member, extending into the axial bore 120 of the sleeve member 110. The abutment members extend into corresponding recesses in the coupling medium to axially locate and retain the coupling medium 80. The abutment member or members may also axially locate the fiber optic cable end portion 42 and the conductor member 44 in the axial bore 120 by providing a relatively firm back stop against which the fiber optic cable end portion and the conductor member may be positioned. It is desirable generally to minimized obstruction of light transmitted through the coupling, and thus the abutment member extends into the axial bore of the sleeve member only as far as is required to support the coupling medium and provide a back stop for the conductor member and fiber optic cable end portion.

The coupling medium 80 is preferably insert molded in the axial bore 120 through injection ports 111 on the sleeve member 110. Alternatively, the coupling medium 80 may be molded or otherwise formed apart from the sleeve member 110, and subsequently inserted or installed therein as disclosed more fully in the related co-pending U.S. application Ser. No. 09/186,688 entitled "Fiber Optic Lighting System Connector" incorporated herein by reference. Thus the coupling medium 80 may be securely disposed and retained in the sleeve member 110 prior to insertion of the fiber optic cable end portion 42 and the conductor member 44.

FIGS. 1 and 2 also illustrates first and second generally annular sealing members 88 and 89 disposed about opposing sides of the convex disk shaped portion of the coupling medium 80. The first and second generally annular sealing members are preferably formed integrally with the coupling medium. In FIG. 1, the first and second generally annular sealing members 88 and 89 are disposed about the fiber optic cable end portions 42 and conductor member 44, respectively, in the axial bore 120 of the sleeve member 110 to form a seal therebetween. In one embodiment illustrated in FIG. 2, the annular sealing members include a contoured surface 81 to better conform with the end portion of the conductor member and to provide improved sealing contact therewith. The first and second generally annular sealing members 88 and 89 are preferably formed unitarily with the convex disk shaped portion of the coupling medium 80 in a molding operation, and may be insert molded simultaneously in the axial bore 120 as discussed above.

These and other aspects of the coupling medium are disclosed more fully in related co-pending U.S. application Ser. No. 09/186,688 entitled "Fiber Optic Lighting System Connector" and in related co-pending U.S. application Ser. No. 09/283,398 entitled "Fiber Optic Lighting System Connector Coupling Medium" both of which are incorporated herein by reference.

FIG. 2 illustrates resilient fingers 130 of the sleeve member 110 having its tooth 136 preferably disposed between and spaced apart from first and second opposing sides 131 and 133 of the corresponding resilient finger 130, only one of which is identified with numerals for clarity. The resilient fingers also have corresponding first and second recesses 141 and 143 disposed on corresponding first and second side portions thereof. The tooth 136 of each resilient finger 130 is aligned between and offset axially relative to the first and second recesses 141 and 143 of the resilient finger so that the spacing between sides 135 and 137 of the tooth 136 and the corresponding sides 131 and 133 of the resilient finger is at least as wide as the corresponding recess 141 and 143.

The recesses 141 and 143 on the resilient fingers 130 are formed by corresponding protuberances on a mold core, not shown, that generally defines the axial bore 120 during molding of the sleeve member 110. After molding, the mold core and the protuberances thereof that form the recesses 141 and 143 are withdrawn axially from the axial bore 120 of the sleeve member 110. In FIG. 2, the recesses 141 and 143 have a bevelled surface 142 and 144 formed by the mold core protuberances to facilitate removal thereof from the recesses. The mold core protuberances and thus the recesses formed thereby may alternatively have a curved surface for this purpose.

During withdrawal of the mold core, the protuberances thereof function to flex the resilient fingers 130 outwardly so that the tooth 136 on the resilient finger 130 does not drag along the mold core, thereby preventing damage to the tooth. The recesses 141 and 143 formed in the resilient fingers 130 are remnants of the mold core protuberances. As the mold core is withdrawn, the protuberances thereof travel along the side portions of the resilient finger and along the side portions 135 and 137 of the tooth without substantial contact or interference with the tooth 136. The spacing between the sides 135 and 137 of the tooth and corresponding sides 131 and 133 of the resilient finger must be sufficient to accommodate the mold core protuberances during mold core withdrawal. Therefore this spacing is at least as wide as the corresponding recesses 141 and 143 formed by the mold core protuberances.

Thus according to the present invention each of the resilient fingers 130 of the sleeve member 110 having a corresponding tooth 136 are preferably formed in a molding operation with a mold core having protuberances disposed in corresponding first and second recesses 141 and 143 on side portions of the resilient finger, whereby the tooth 136 is formed sufficiently narrowly to permit withdrawal of the mold core protuberances along opposing sides thereof, as discussed above. At least one and preferably all of the resilient fingers of the sleeve member have a tooth thus formed.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fiber optic lighting system connector useable for coupling a fiber optic cable end portion to a light transmitting conductor member, comprising:

a sleeve member having an axial bore for receiving a fiber optic cable end portion in a first end portion thereof and a conductor member in a second end portion thereof, the sleeve member having a first plurality of resilient fingers partially defining the axial bore of the sleeve member, a first cap having an axial bore, the first cap disposable about the first plurality of resilient fingers and non-threadably coupled to the sleeve member, a first ramped surface on the axial bore of the first cap engageable with the first plurality of resilient fingers to constrict the first plurality of resilient fingers radially inwardly, the constricted first plurality of resilient fingers engageable with a fiber optic cable end portion disposed in the axial bore of the sleeve member.

2. The connector of claim 1, the first cap slidable axially relative to the sleeve member between a first position where the first plurality of resilient fingers are constricted and a second position where the first plurality of resilient fingers are not constricted, a first finger protuberance extending generally outwardly from at least one of the first plurality of resilient fingers, a first cap protuberance extending into the axial bore of the first cap, the first finger protuberance of the plurality of resilient fingers engageable with the first cap protuberance to maintain the first cap in the first position.

3. The connector of claim 2, a first cap recess disposed in the axial bore of the first cap, the first finger protuberance of the plurality of resilient fingers disposable in the first cap recess when the first cap is in the second position.

4. The connector of claim 3, a second cap protuberance spaced axially from the first cap protuberance and extending into the axial bore of the first cap, the first cap recess disposed between the first and second cap protuberances, the first finger protuberance of the plurality of resilient fingers engageable with the second cap protuberance to prevent separation of the first cap from the sleeve member.

5. The connector of claim 2, the first plurality of resilient fingers each have a corresponding first finger protuberance extending generally outwardly, the first finger protuberance of the plurality of first fingers engageable with a corresponding portion of the first cap protuberance to maintain the first cap in the first position.

6. The connector of claim 5, each of the first plurality of resilient fingers having a corresponding first tooth engageable with a fiber optic cable end portion disposed in the axial bore of the sleeve member when the first plurality of resilient fingers are constricted, the first finger protuberance is offset relative to the tooth on the corresponding resilient finger.

7. The connector of claim 2, the first cap protuberance is a generally annular member extending into the axial bore of the first cap, and the first plurality of resilient fingers each have a corresponding first finger protuberance extending generally outwardly.

8. The connector of claim 7, the second cap protuberance is a generally annular member extending into the axial bore of the first cap, and the first recess is a generally annular recess disposed between the first and second cap protuberances, the first finger protuberance of the plurality of resilient fingers disposable in the first cap recess when the first cap is in the second position.

9. The connector of claim 1, each of the first plurality of resilient fingers having a corresponding first tooth engageable with a fiber optic cable end portion disposed in the axial bore of the sleeve member when the first plurality of resilient fingers are constricted.

10. The connector of claim 1 further comprising a plurality of generally wedge shaped rib members aligned axially and extending radially inwardly from the axial bore of the sleeve member, the plurality of generally wedge shaped rib members engageable with a fiber optic cable end portion disposed in the axial bore of the sleeve member.

11. The connector of claim 1 further comprising:

the sleeve member having a second plurality of resilient fingers partially defining the axial bore of the sleeve member, a second cap having an axial bore, the second cap disposable about the second plurality of resilient fingers and non-threadably coupled to the sleeve member, a second ramped surface on the axial bore of the second cap engageable with the second plurality of resilient fingers to constrict the second plurality of resilient fingers radially inwardly, the constricted second plurality of resilient fingers engageable with a conductor member portion disposed in the axial bore of the sleeve member.

12. The connector of claim 11, each of the first and second plurality of resilient fingers having a corresponding tooth engageable with a corresponding fiber optic cable end portion and conductor member disposed in the axial bore of the sleeve member when the resilient fingers are constricted.

13. The connector of claim 1 further comprising a coupling medium disposed in the axial bore of the sleeve member, the coupling medium having a first convex end engageable with a fiber optic cable end portion moved axially into the axial bore of the sleeve member, and the coupling medium having an opposing second convex end engageable with a conductor member moved axially into the axial bore of the sleeve member.

14. The connector of claim 13, the coupling medium is a resilient material having a refractive index substantially the same as a refractive index of a fiber optic cable end portion and a conductor member disposed in the axial bore of the sleeve member.

15. The connector of claim 13, the coupling medium is a unitary member having a generally disk shaped portion with the first and opposing second ends, the coupling medium having first and second sealing members disposed thereabout on corresponding opposing first and second ends thereof, the first and second sealing members are engageable with the axial bore of the sleeve member and a corresponding one of a fiber optic cable end portion and a conductor member disposed in the axial bore of the sleeve member.

16. The connector of claim 1, each of the first plurality of resilient fingers having a first recess disposed on a first side portion thereof and a second recess disposed on a second side portion thereof, each of the first plurality of resilient fingers having a first tooth engageable with a fiber optic cable end portion disposed in the axial bore of the sleeve member when the first plurality of resilient fingers are constricted, the first tooth disposed between the first and second recesses of the corresponding resilient finger and offset axially relative thereto.

17. A connector useable for coupling a fiber optic cable end portion to a light transmitting conductor member in a fiber optic lighting system, comprising:

a sleeve member having an axial bore for receiving a fiber optic cable end portion and a conductor member, the sleeve member having a first plurality of resilient fingers partially defining the axial bore of the sleeve member, at least one of the first plurality of resilient fingers having a first tooth extending toward the axial bore of the sleeve member, the at least one of the first plurality of resilient fingers having the first tooth having a first recess disposed on a first side portion thereof and a second recess disposed on a second side portion thereof, the first tooth disposed between the first and second recesses and offset axially relative thereto, the first plurality of resilient fingers constrictable radially inwardly and engageable with a fiber optic cable end portion disposed in the axial bore of the sleeve member.

18. The connector of claim 17, the first tooth is disposed near an end portion of the corresponding resilient finger, and the first and second recesses are disposed on an intermediate portion of the corresponding resilient finger.

19. The connector of claim 17, each of the first plurality of resilient fingers having a corresponding first tooth extending toward the axial bore of the sleeve member, each of the first plurality of resilient fingers having a corresponding first recess disposed on a first side portion thereof and a corresponding second recess disposed on a second side portion thereof, the first tooth disposed between the first and second recesses and offset axially relative thereto.

20. The connector of claim 17 further comprising a first cap disposable about the first plurality of resilient fingers and engageable therewith to constrict the first plurality of resilient fingers radially inwardly.

* * * * *